United States Patent [19]
Araki

[11] Patent Number: 5,711,149
[45] Date of Patent: Jan. 27, 1998

[54] DEVICE FOR PURIFYING THE EXHAUST GAS OF A DIESEL ENGINE

[75] Inventor: Yasushi Araki, Susono, Japan

[73] Assignee: Toyota Jidosha Kabushiki Kaisha, Toyota, Japan

[21] Appl. No.: 647,740

[22] Filed: May 15, 1996

[30] Foreign Application Priority Data

May 18, 1995 [JP] Japan .................. 7-119852

[51] Int. Cl.⁶ .................. F02M 25/07; F01N 3/36
[52] U.S. Cl. .................. 60/278; 60/286; 60/297; 422/183
[58] Field of Search ............... 60/278, 286, 297, 60/300; 422/172, 183

[56] References Cited

U.S. PATENT DOCUMENTS

| | | | |
|---|---|---|---|
| 3,699,683 | 10/1972 | Tourtellotte et al. | 60/274 |
| 4,294,220 | 10/1981 | Yasuhara et al. | 123/568 |
| 4,322,387 | 3/1982 | Virk et al. | 422/174 |
| 4,345,429 | 8/1982 | Yasuhara | 60/297 |
| 4,359,863 | 11/1982 | Virk et al. | 60/297 |
| 4,372,111 | 2/1983 | Virk et al. | 60/297 |
| 4,449,362 | 5/1984 | Frankenberg et al. | 60/274 |
| 4,535,588 | 8/1985 | Sato et al. | 60/286 |
| 5,067,320 | 11/1991 | Kanesaki | 60/297 |
| 5,207,990 | 5/1993 | Sekiya et al. | 422/183 |
| 5,544,482 | 8/1996 | Matsumoto et al. | 60/297 |
| 5,634,331 | 6/1997 | Aoki et al. | 60/297 |

FOREIGN PATENT DOCUMENTS

| | | |
|---|---|---|
| A-1382418 | 11/1964 | France . |
| A-4238068 | 5/1993 | Germany . |
| 61-122718 | 5/1986 | Japan . |
| U-61-181814 | 11/1986 | Japan . |
| A-63-198717 | 8/1988 | Japan . |
| U-64-6311 | 1/1989 | Japan . |
| A-3-96611 | 4/1991 | Japan . |

*Primary Examiner*—Willis R. Wolfe
*Attorney, Agent, or Firm*—Oliff & Berridge

[57] ABSTRACT

A device for purifying the exhaust gas of a diesel engine comprises a filter for collecting particulates which is arranged in the exhaust system of the engine, an oxidation catalyst arranged in the exhaust system upstream of the filter, diesel fuel supply unit for supplying diesel fuel to the oxidation catalyst when the filter must be regenerated, and a heater. The heater heats the diesel fuel supplied from the diesel fuel supply unit to the oxidation catalyst only in the initial step of supplying the diesel fuel when the temperature of the oxidation catalyst is lower than a predetermined temperature and the filter must be regenerated.

14 Claims, 7 Drawing Sheets

DEVICE FOR PURIFYING THE EXHAUST GAS OF A DIESEL ENGINE

BACKGROUND OF THE INVENTION

1. Field of the Invention

The present invention relates to a device for purifying the exhaust gas of a diesel engine.

2. Description of the Related Art

An exhaust system of an diesel engine is usually provided with a filter for collecting noxious particulates such a carbon particulates contained in the exhaust from a diesel engine. Once the filter collects a large amount of particulates, the resistance of the exhaust system becomes very large and thus the engine power drops. Accordingly, the filter must be periodically regenerated by burning and removing the particulates collected in the filter.

If the engine is operated at a very high speed, the temperature of exhaust gas becomes very high and thus the particulates burn due to the heat of exhaust gas so that the filter is naturally regenerated. However, the engine may not be periodically operated at a very high speed, so that it must be made possible to regenerate the filter when the engine is operated at a normal speed. For the purpose, it is known that fuel which is easy to burn, for example, hydrogen, gasoline, or alcohol can be supplied to the filter and it is ignited thereon and thus the particulates are burned by the heat and the flame thereof. However, it is complicated to supply a fuel other than diesel fuel in a vehicle having a diesel engine. Accordingly, Japanese Unexamined Patent Publication No. 63-198717 discloses that diesel fuel, which is not easy to burn, is used as the fuel for regenerating the filter, and an oxidation catalyst is arranged upstream of the filter to surely ignite the diesel fuel.

According to the above-mentioned art, when the engine is operated in normal speed, i.e., when the temperature of exhaust gas is not very high, the oxidation catalyst vaporizes diesel fuel and ignites the vaporized diesel fuel, and thus the filter can be regenerated by the heat of the burning diesel fuel. However, if the temperature of the oxidation catalyst is not high enough to vaporize diesel fuel supplied to the filter, the diesel fuel is emitted to the atmosphere via the filter, as non-burned fuel. Thus, the art can not regenerate the filter when the temperature of the oxidation catalyst is low at a normal engine speed, and has room for improvement.

SUMMARY OF THE INVENTION

Therefore, an object of the present invention is to provide a device for purifying the exhaust gas of a diesel engine, capable of regenerating a filter for collecting particulates by use of diesel fuel and an oxidation catalyst arranged upstream of the filter even if a temperature of the oxidation catalyst is low at a normal engine speed.

According to the present invention, there is provided a first device for purifying the exhaust gas of a diesel engine comprising: a filter for collecting particulates, which is arranged in the exhaust system of the engine; an oxidation catalyst arranged in the exhaust system upstream of the filter; diesel fuel supply means for supplying diesel fuel to the oxidation catalyst when the filter must be regenerated; and heating means for heating the diesel fuel supplied from the diesel fuel supply means to the oxidation catalyst only in the initial step of supplying the diesel fuel when the temperature of the oxidation catalyst is lower than a predetermined temperature and the filter must be regenerated.

According to the present invention, there is provided a second device for purifying the exhaust gas of a diesel engine comprising: a filter for collecting particulates, which is arranged in the exhaust system of the engine; an oxidation catalyst arranged in the exhaust system upstream of the filter; diesel fuel supply means for supplying diesel fuel to the oxidation catalyst when the filter must be regenerated; and separation means for separating light molecular weight components from the diesel fuel supplied from the diesel fuel supply means to supply the light molecular weight components to the oxidation catalyst in the initial step of supplying the diesel fuel.

According to the present invention, there is provided a third device for purifying the exhaust gas of a diesel engine comprising: a filter for collecting particulates, which is arranged in the exhaust system of the engine; an oxidation catalyst arranged in the exhaust system upstream of the filter; diesel fuel supply means for supplying diesel fuel to the oxidation catalyst when the filter must be regenerated; and changing means for changing the molecular weight of the diesel fuel, supplied from the diesel fuel supply means to the oxidation catalyst, at least in the initial step of supplying the diesel fuel, to a lighter molecular weight by use of the heat of the previous filter regeneration.

According to the present invention, there is provided a fourth device for purifying the exhaust gas of a diesel engine comprising: a filter for collecting particulates, which is arranged in the exhaust system of the engine; an oxidation catalyst arranged in the exhaust system upstream of the filter; diesel fuel supply means for supplying diesel fuel to the oxidation catalyst when the filter must be regenerated; intake air decreasing means for decreasing an amount of intake air in the initial step of supplying the diesel fuel; and diesel fuel decreasing means for decreasing the amount of diesel fuel supplied from the diesel fuel supply means when the amount of intake air is decreased by the intake air decreasing means.

The present invention will be more fully understood from the description of preferred embodiments of the invention as set forth below, together with the accompanying drawings.

DESCRIPTION OF THE PREFERRED EMBODIMENTS

Figure 1:
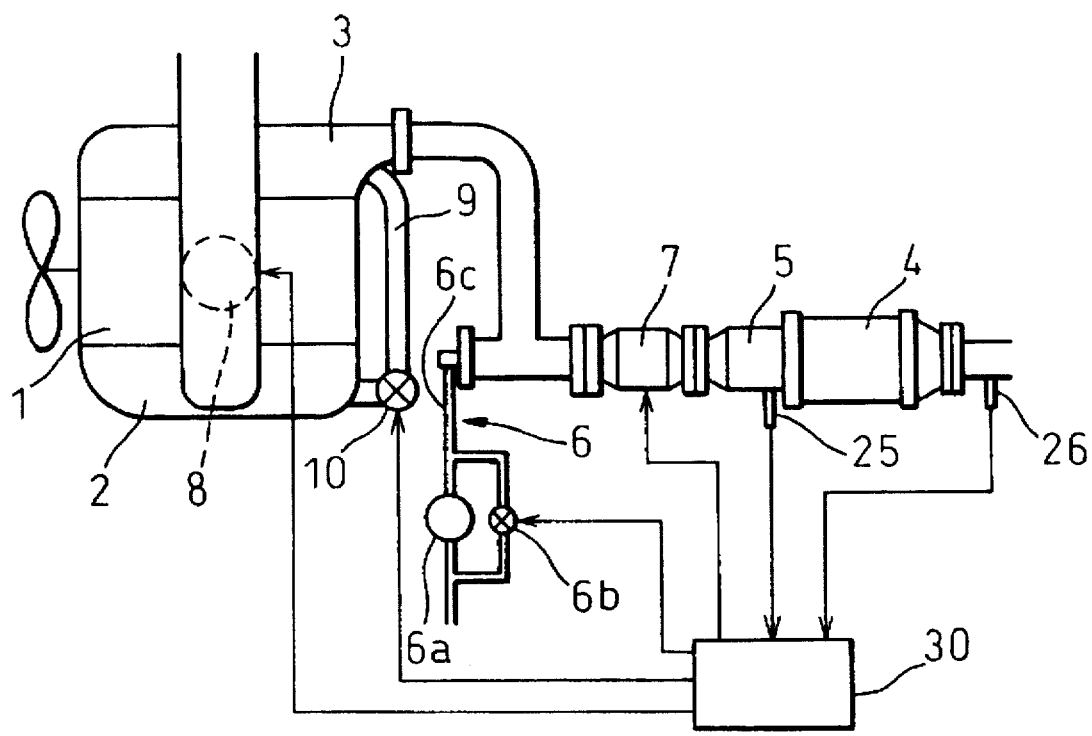
FIG. 1 is a schematic view of a device for purifying exhaust gas of a diesel engine according to a first embodiment of the present invention.

FIG. 1 is a schematic view of a device for purifying the exhaust gas of a diesel engine according to a first embodiment of the present invention. In this figure, reference numeral 1 designates a diesel engine, 2 an intake system, 3 an exhaust system. The exhaust system 3 has a filter 4 for collecting particulates contained in exhaust gas, and an oxidation catalyst 5 upstream of the filter 4. In the exhaust system 3, a diesel fuel supply unit 6 is arranged and an electric heater unit 7 is arranged between the diesel fuel supply unit 6 and the oxidation catalyst 5.

In the intake system 2, a throttle valve 8 is arranged upstream of an intake-manifold. Reference numeral 9 designates an exhaust gas recirculation (EGR) passage which connects the intake system 2 upstream of the intake-manifold with the exhaust system 3 downstream of an exhaust-manifold and upstream of the diesel fuel supply unit 6. In the EGR passage 9, an EGR valve 10 is arranged.

Once the filter 4 collects a large amount of particulates, the exhaust resistance in the exhaust system 3 becomes very large and the engine power drops. Accordingly, it is determined if the filter 4 must be regenerated in accordance with a differential exhaust gas pressure between the upstream and the downstream of the filter 4 and the like. When the result is affirmative, the particulates on the filter 4 must be burned. If a temperature of exhaust gas is very high when the result is affirmative, the particulates start to burn naturally. However, if a temperature of exhaust gas is low, the particulates do not start to burn naturally. Accordingly, the diesel fuel supply unit 6 supplies diesel fuel to the oxidation catalyst 5 and diesel fuel is burned thereon and thus the particulates are burned by the heat of the burning diesel fuel. The diesel fuel supply unit 6 is connected to a fuel tank (not shown) of the engine 1 via a fuel passage 6c in which a pump 6a is arranged. The diesel fuel supply unit 6 has a bypass passage which bypasses the pump 6a and in which a control valve 6b is arranged to regulate an amount of diesel fuel supplied to the filter 4.

Figure 2:
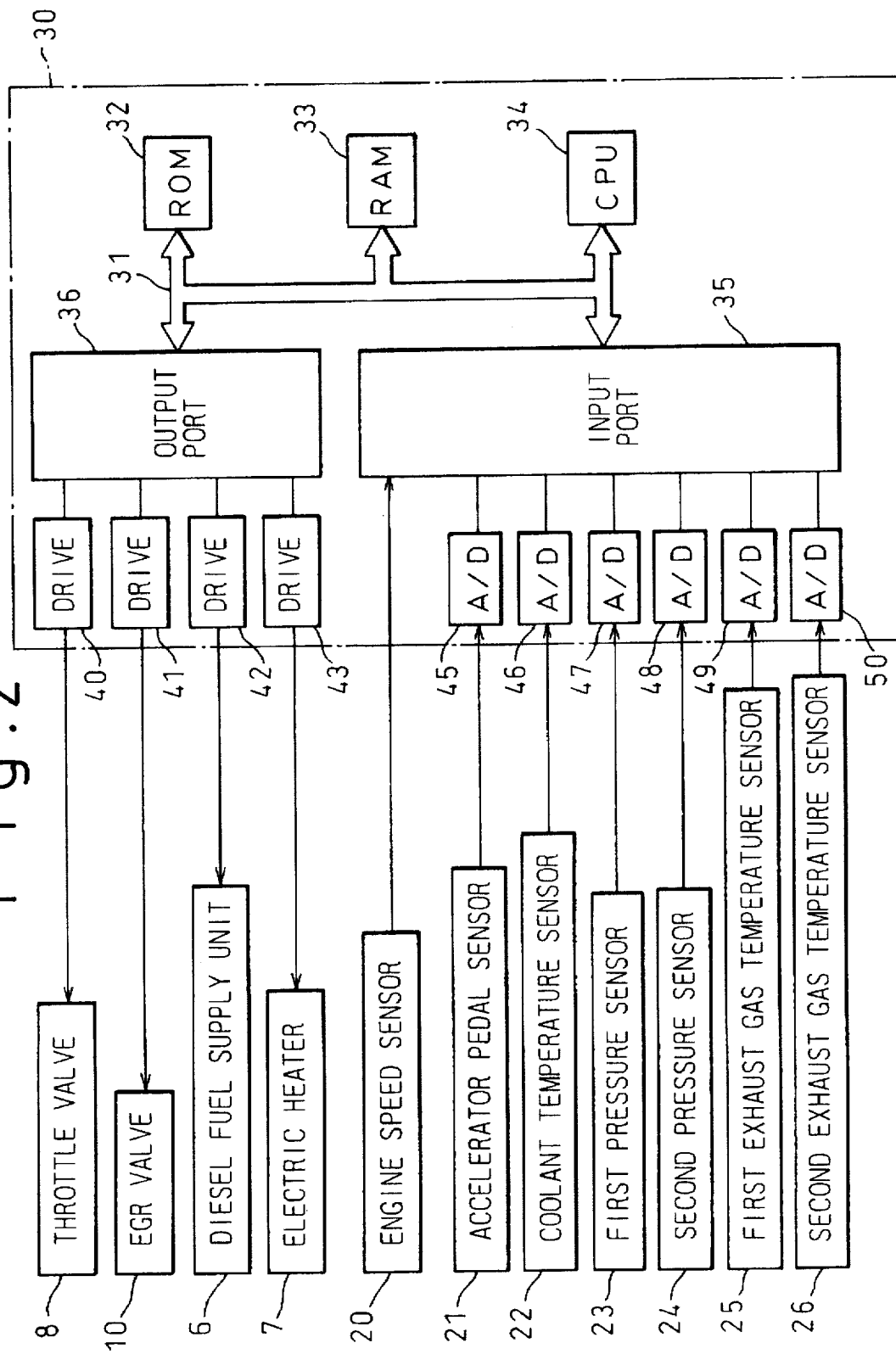
FIG. 2 is a schematic view of the ECU in FIG. 1.

Reference numeral 30 designates an electronic control unit (ECU) for controlling the throttle valve 8, the EGR valve 10, the diesel fuel supply unit 6, and the electric heater 7. As shown in FIG. 2, the ECU 30 is constructed as a digital computer and includes a ROM (read only memory) 32, a RAM (random access memory) 33, a CPU (microprocessor, etc.) 34, an input port 35, and an output port 36, which are interconnected by a bidirectional bus 31.

The throttle valve 8, the EGR valve 10, the diesel fuel supply unit 6, and the electric heater 7 are connected to the output port 36 of the ECU 30, via drive circuits 40, 41, 42, and 43, respectively. An engine speed sensor 20, which produces output pulses representing the engine speed, is connected to the input port 35. An accelerator pedal sensor 21 produces an output voltage which is proportional to the movement of the accelerator pedal, i.e., a current engine load, and this output voltage is input into the input port 35 via an AD converter 45. A coolant temperature sensor 22 produces an output voltage which is proportional to the temperature of the cooling water of the engine 1 and is considered to be the engine temperature, and this output voltage is input into the input port 35 via an AD converter 46. A first pressure sensor 23 produces an output voltage which is proportional to the exhaust gas pressure immediately upstream of the filter 4, and this output voltage is input into the input port 35 via an AD converter 47. A second pressure sensor 24 produces an output voltage which is proportional to the exhaust gas pressure immediately downstream of the filter 4, and this output voltage is input into the input port 35 via an AD converter 48. A first exhaust gas temperature sensor 25 produces an output voltage which is proportional to the exhaust gas temperature immediately upstream of the filter 4, and this output voltage is input into the input port 35 via an AD converter 49. A second exhaust gas temperature sensor 26 produces an output voltage which is proportional to the exhaust gas temperature immediately downstream of the filter 4, and this output voltage is input into the input port 35 via an AD converter 50.

Figure 3:
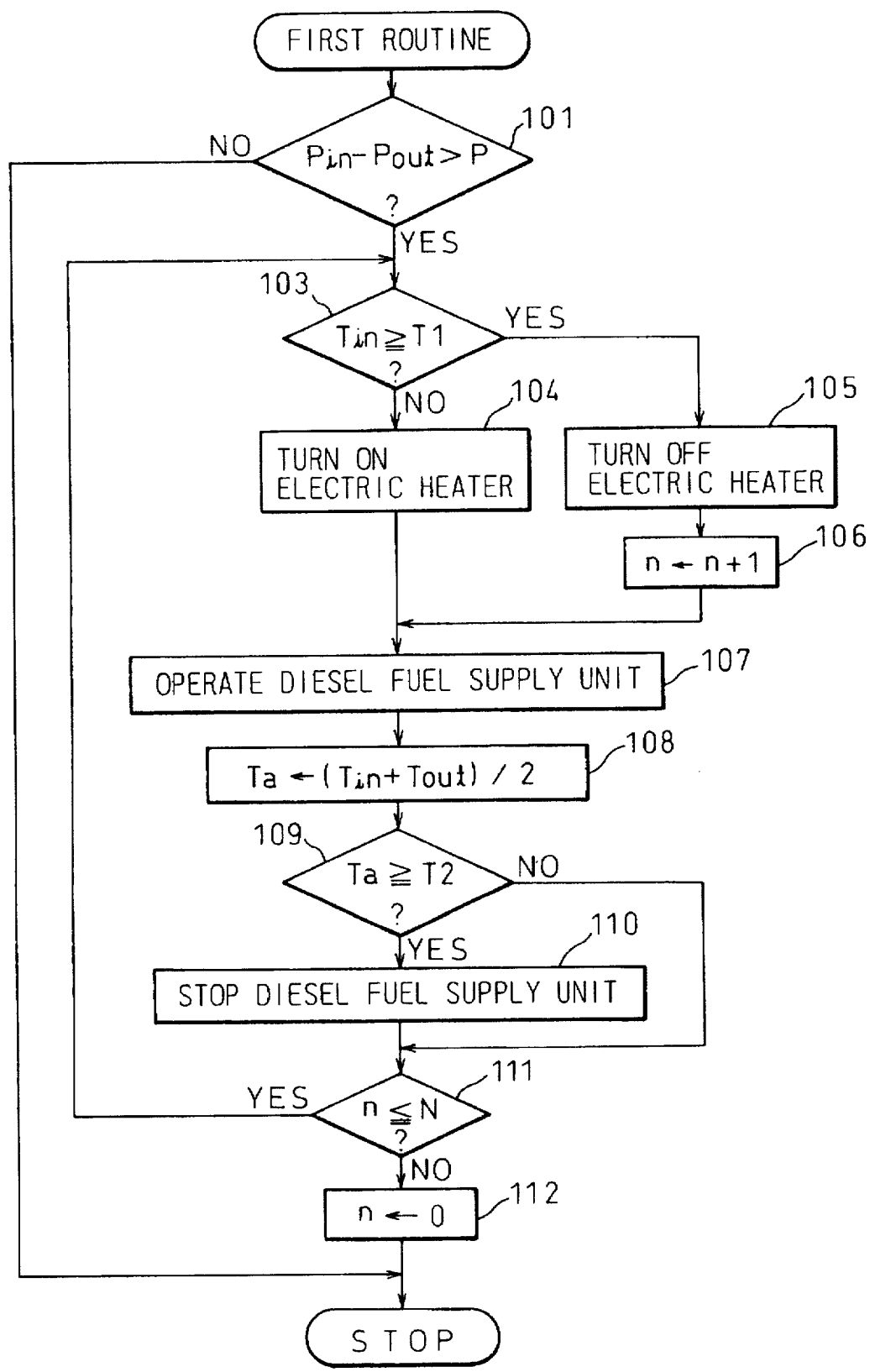
FIG. 3 is a first routine for controlling the diesel fuel supply unit and the electric heater.

The ECU 30 usually controls the opening degree of the throttle valve 8 and of the EGR valve in accordance with a current engine operating condition on the basis of the outputs of the engine speed sensor 20, the accelerator pedal sensor 21, and the coolant temperature sensor 22. The ECU 30 controls the diesel fuel supply unit 6 and the electric heater 7, according to a first routine shown in FIG. 3. The routine is started simultaneously with the engine starting and is repeated at every predetermined period.

First, at step 101, it is determined if a difference [Pin-Pout] between exhaust gas pressures upstream and downstream of the filter 4 detected by the first and second exhaust gas pressure sensors 23 and 24 is larger than a predetermined pressure [P]. When the result is negative, the amount of particulate collected in the filter 4 is not large and the routine is stopped. On the other hand, when the result at step 101 is affirmative, the filter 4 must be regenerated and the routine goes to step 103.

An step 103, a temperature [Tin] of the exhaust gas flowing into the filter 4 is measured by the first exhaust gas temperature sensor 25, and it is determined if the temperature [Tin] is equal to or higher than a first predetermined temperature [T1]. When the result is negative, the routine goes to step 104 and the electric heater 7 is turned on and the routine goes to step 107. On the other hand, when the result at step 103 is affirmative, the routine goes to step 105 and the electric heater 7 is turned off. Next, at step 106, a count value [n], which is reset to [0] initially, is increased by [1] and the routine goes to step 107.

At step 107, the diesel fuel supply unit 6 is operated and thus diesel fuel is supplied to the oxidation catalyst 5. Next, at step 108, the temperature [Tout] of the exhaust gas flowing out from the filter 4 is measured by the second exhaust gas temperature sensor 26, and an average [Ta] of the temperatures [Tin] and [Tout] is calculated, as the temperature of the filter 4. Next, at step 109, it is determined if the average [Ta] is equal to or higher than a second predetermined temperature [T2]. Only when the result is negative, is the diesel fuel supply unit stopped at step 110. Next, the routine goes to step 111 and it is determined if the count value [n] is equal to or smaller than a predetermined value [N]. When the result is affirmative, the routine returns to step 103. Thus, the above-mentioned process is repeated until the result at step 111 is negative. When the result at step 111 is negative, the routine goes to step 112 and the count value [n] is reset to [0] and the routine is stopped.

According to the routine, when the filter 4 must be regenerated, if a temperature [Tin] of exhaust gas flowing into the filter 4 is lower than the first predetermined temperature [T1], i.e., if a temperature of the oxidation catalyst 5 is low and the oxidation catalyst 5 cannot vaporize the diesel fuel supplied thereto, the electric heater 7 is turned on. The electric heater 7 which is arranged between the diesel fuel supply unit 6 and the oxidation catalyst 5 is relative small size and has a small heat capacity so that the temperature thereof rises immediately. Therefore, the diesel fuel supplied from the diesel fuel supply unit 6 to the oxidation catalyst 5 can be vaporized.

Even if the temperature of the oxidation catalyst 5 is low, the vaporized diesel fuel can be surely burned thereby. Once burning of the diesel fuel is started in the oxidation catalyst 5, a temperature of the oxidation catalyst 5 itself rises due to the heat thereof. Thereafter, if liquid diesel fuel is supplied to the oxidation catalyst 5, it can surely vaporize the liquid diesel fuel so that the electric heater 7 can be turned off.

Thus, once the diesel fuel is burned in the oxidation catalyst 5, a temperature [Tin] of exhaust gas flowing into the filter 4 rises so that the particulates are burned at the filter 4. In the initial burning thereof, the filter 4 absorbs the heat from the exhaust gas so that a temperature [Tout] of exhaust gas flowing out from the filter 4 is lower than the temperature [Tin] of exhaust gas flowing into the filter 4. Thereafter, exhaust gas in the filter 4 is heated by the burning heat of the particulates, so that the temperature [Tout] of the exhaust gas flowing out from the filter 4 is higher than the temperature [Tin] of exhaust gas flowing into the filter 4. In either case, the temperature of the filter 4 is between the temperatures [Tin] and [Tout], and is calculated as an average of the temperatures [Tin] and [Tout]. When the temperature of the filter 4 becomes higher than the second predetermined temperature [T2], the particulates burn sufficiently. Therefore, even if a temperature [Tin] of exhaust gas flowing into the filter 4 is low, the remainder of the particulates can be burned by the burning heat of the particulates so that the diesel fuel supply unit 6 can be stopped.

The count value [n] corresponds to an elapsed time after the electric heater 7 is turned off. When the count value [n] reaches the predetermined value [N], all of the particulates have burned out and the regeneration of the filter 4 has been finished so that the routine is stopped. In the routine, when the filter 4 must be regenerated, if a temperature [Tin] of exhaust gas flowing into the filter 4 is high and the diesel fuel supplied to the oxidation catalyst 5 can be vaporized thereon, it is not necessary that the electric heater 7 is turned on.

In the routine, when diesel fuel is supplied to the oxidation catalyst 5, the current temperature [Tin] of exhaust gas flowing into the filter 4 and the current flow rate of exhaust gas are taken account of, and the supplied amount of diesel fuel per a unit time is determined to raise a temperature of the current exhaust gas to a temperature at which the particulates can burn, and an opening degree of the control valve 6b of the diesel fuel supply unit 6 is controlled to supply the determined amount of diesel fuel per the unit time. Therefore, in detail, the first predetermined temperature [T1] at step 103 is a temperature an which such supplied diesel fuel can be vaporized and varies such that higher it becomes, larger is the determined amount of diesel fuel per the unit time.

Figure 4:
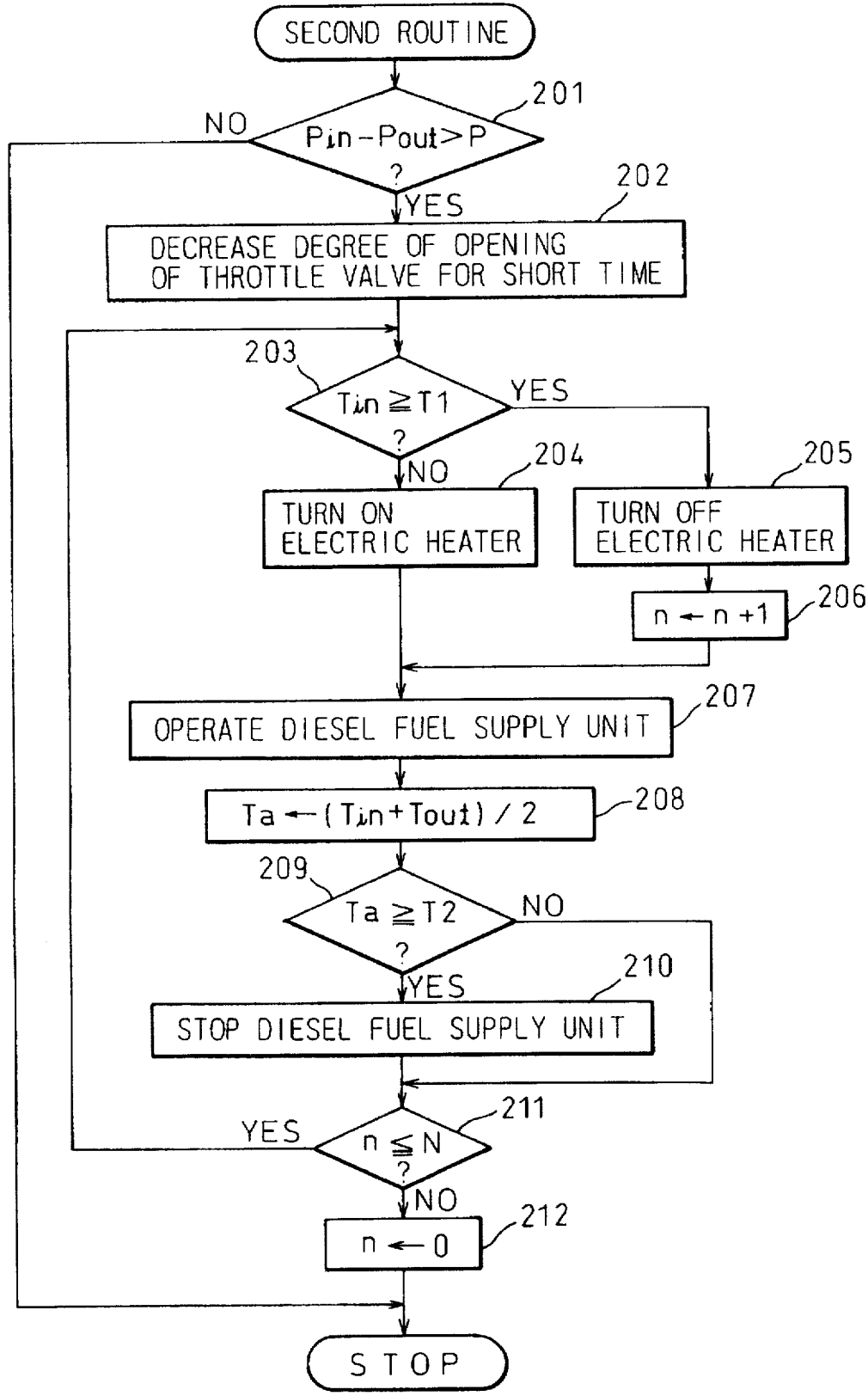
FIG. 4 is a second routine for controlling the diesel fuel supply unit and the electric heater.

FIG. 4 shows a second routine for controlling the diesel fuel supply unit 6 and the electric healer 7. The differences between the first routine and the second routine only are explained. In the second routine, a process at step 202 is added. The process is that a current degree of opening of the throttle valve 8, which is determined in accordance with a current engine operating condition, is decreased for a short time. Therefore, in the initial step of the diesel fuel supplying, a flow rate of intake air becomes small and a flow rate of exhaust gas can be made small so that the supplied amount of diesel fuel per the unit time can be made small and the first predetermined temperature [T1] becomes low. Accordingly, a period for turning on the electric heater 7 can be made small. Thereafter, the degree of opening of the throttle valve 8 is returned to the determined one in accordance with the current engine operating condition, and the supplied amount of diesel fuel per the unit time is increased. However, once the burning of the diesel fuel is started in the oxidation catalyst, the temperature thereof rises so that the supplied diesel fuel can be vaporized sufficiently. According to this idea, in the case that the electric heater 7 is eliminated, the temperature of the oxidation catalyst 5 at which the diesel fuel can be supplied thereto can be set lower so that the engine operating condition area in which the filter 4 can be regenerated is enlarged. It is not preferable to decrease a flow rate of intake air in the engine operation. However, this is for a short time and a large problem does not occur. Moreover, during deceleration, no problem occurs.

Figure 5:
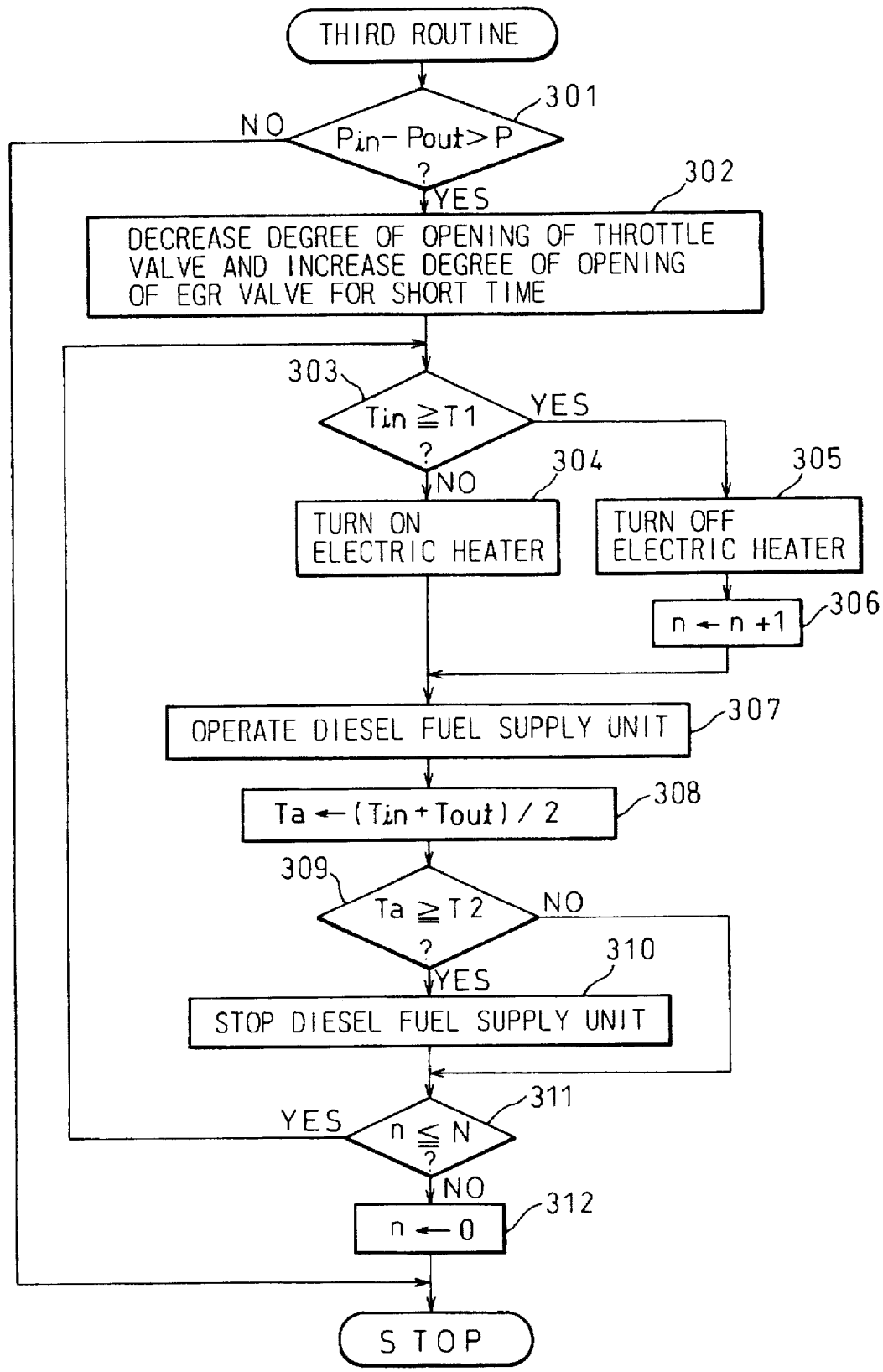
FIG. 5 is a third routine for controlling the diesel fuel supply unit and the electric heater.

FIG. 5 shows a third routine for controlling the diesel fuel supply unit 6 and the electric heater 7. The differences between the first routine and the third routine only are explained. In the third routine, a process at step 302 is added. The process is that a current degree of opening of the throttle valve 8, which is determined in accordance with a current engine operating condition, is decreased, and a current degree of opening of the EGR valve 10, which is determined in accordance with a current engine operating condition, is increased for a short time. Therefore, in the initial step of supplying the diesel fuel, the flow rate of exhaust gas is not changed but the temperature of exhaust gas can be made high to increase an amount of the recirculation exhaust gas so that the supplied amount of diesel fuel per the unit time can be made small so that a period for turning on the electric heater 7 can be made small. Moreover, the engine operating condition area in which the filter 4 can be regenerated is enlarged. Once an amount of the recirculation exhaust gas is increased, combustion deteriorates and smoke can be generated. However, the smoke burns with the diesel fuel in the oxidation catalyst 5 so that the smoke is not emitted to the atmosphere.

Figure 6:
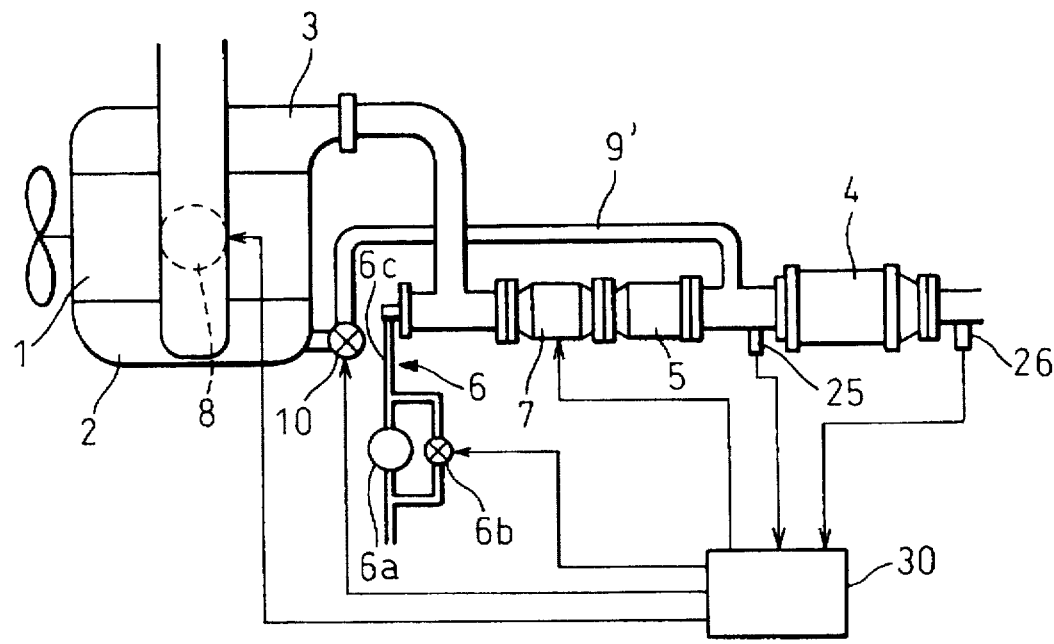
FIG. 6 is a schematic view of a device for purifying exhaust gas of a diesel engine according to a second embodiment of the present invention.

FIG. 6 shows a schematic view of a device for purifying the exhaust gas of a diesel engine according to a second embodiment of the present invention. The differences between the first embodiment and the second embodiment only will be explained. In the second embodiment, the EGR passage 9' connects the intake system 2 upstream of the intake-manifold with the exhaust system 3 between the oxidation catalyst 5 and the filter 4. According to the construction, if non-burned diesel fuel is discharged from the oxidation catalyst 5, almost all the discharged diesel fuel is recirculated to the combustion chamber of the engine 1 and is not emitted to the atmosphere via the filter 4. Moreover, in the combustion chamber, the compressed air contains the diesel fuel so that a combustion speed becomes high, and a good combustion can be realized, and the amounts of CO, HC, and NOx contained in the exhaust gas can be reduced.

Figure 7:
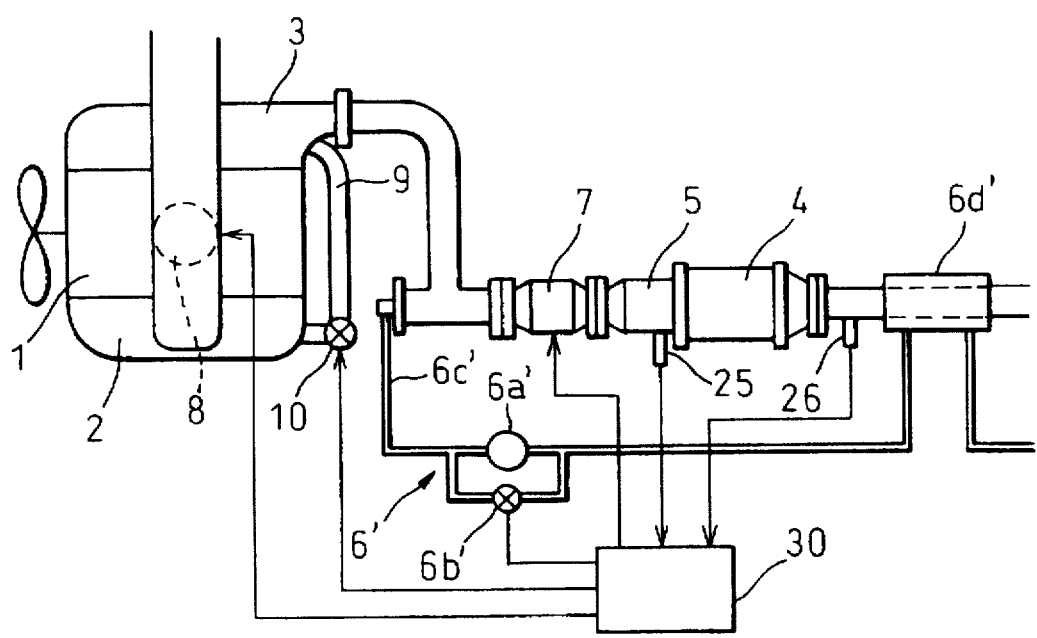
FIG. 7 is a schematic view of a device for purifying exhaust gas of a diesel engine according to a third embodiment of the present invention.

FIG. 7 shows a schematic view of a device for purifying the exhaust gas of a diesel engine according to a third embodiment of the present invention. The differences between the first embodiment and the third embodiment only will be explained. In the third embodiment, the fuel passage 6c' of the diesel fuel supply unit 6' connects the fuel tank of the engine 1 via a heat exchanger 6d' which is arranged around the exhaust system 3 downstream of the filter 4. According to the construction, in the case that diesel fuel is supplied to the oxidation catalyst 5 when the filter 4 must be regenerated, the supplied diesel fuel had been heated by the heat exchanger 6d' during the previous particulate burning period so that the molecular weight of the supplied diesel fuel is reduced. Namely, the fuel passage 6c' downstream of the heat exchanger 6d' is filled with diesel fuel which has a low molecular weight.

Therefore, at least in the initial step of supplying the diesel fuel, the diesel fuel which has a light molecular weight is supplied to the oxidation catalyst 5. The low molecular-weight diesel fuel is vaporized easier than normal diesel fuel. Accordingly, when the temperature of the oxidation catalyst 5 is low, the supplied diesel fuel can be vaporized so that the electric heater 7 can be made smaller than in the first embodiment. On the other hand, in the case that the electric heater 7 is eliminated, a temperature of the oxidation catalyst 5 at which the diesel fuel can be supplied thereto can be set lower so that the engine operating condition area in which the filter 4 can be regenerated enlarges.

Figure 8:
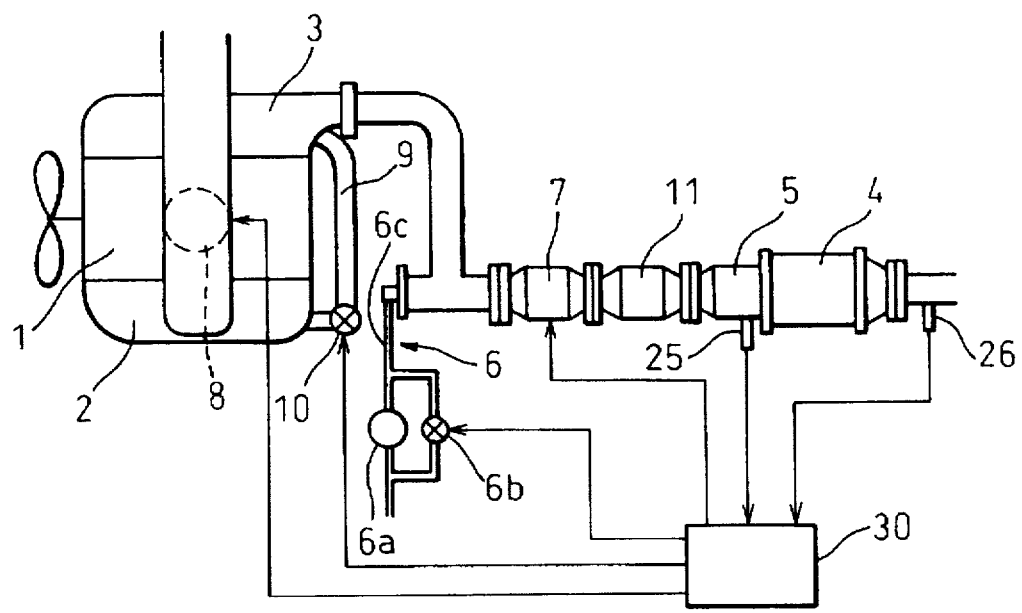
FIG. 8 is a schematic view of a device for purifying exhaust gas of a diesel engine according to a fourth embodiment of the present invention.

FIG. 8 shows a schematic view of a device for purifying the exhaust gas of a diesel engine according to a fourth embodiment of the present invention. The differences between the first embodiment and the fourth embodiment only will be explained. In the fourth embodiment, an absorption unit 11, which absorbs hydrocarbon, i.e., diesel fuel, is arranged between the electric heater 7 and the oxidation catalyst 5. According to the construction, in the case that diesel fuel is supplied to the oxidation catalyst 5 when the filter 4 must be regenerated, the absorption unit 11 absorbs the diesel fuel vaporized by the electric heater 7, or liquid diesel fuel when the electric heater 7 is turned off. Thereafter the absorption unit 11 initially releases only the light molecular weight components of the absorbed diesel fuel. The components have low boiling points so that they are easy to burn in the oxidation catalyst 5. Moreover, in the case that the electric heater 7 is eliminated, a temperature of the oxidation catalyst 5 at which the components of the diesel fuel can be burned is low so that the engine operating condition area in which the filter 4 can be regenerated enlarges. Thereafter, the absorption unit 11 releases the heavy molecular weight components of the absorbed diesel fuel. At this time, the light molecular weight components have already burned in the oxidation catalyst 5 and the temperature thereof has already risen so that the heavy molecular weight components can be burned in the oxidation catalyst 5.

In all the embodiments, the electric heater 7 can be replaced by a heating means which can use any energy other than electric energy, for example, a burner. Moreover, in the case that the electric heater 7 is replaced with an electric heating tape catalytic converter, when the electric heating type catalytic converter functions as the catalytic converter, it purifies the particulates in exhaust gas so that the time to regenerate the filter 4 can be extended.

Figure 9:
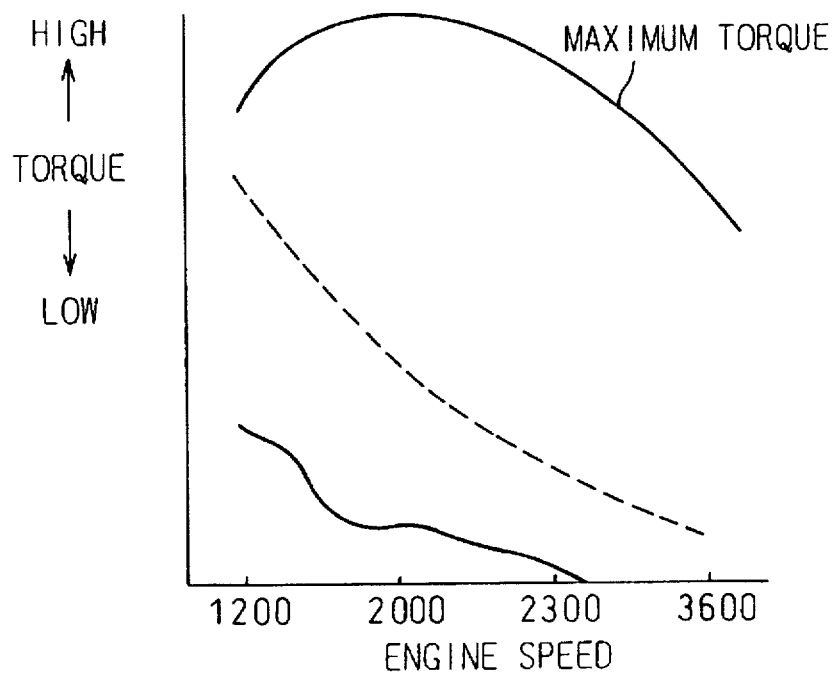
FIG. 9 is a map for showing the engine operating condition areas in which the filter can be regenerated.

FIG. 9 is a map showing the engine operating condition areas in which the filter can be regenerated. In the map, the area in the prior art is above the dotted line, and the area in the first embodiment which has the electric heater is above the solid line. Thus, according to the present invention, the area in which the filter can be regenerated can be extended considerably.

Although the invention has been described with reference to specific embodiments thereof, it should be apparent that numerous modifications can be made thereto, by those skilled in the art, without departing from the basic concept and scope of the invention.

I claim:

1. A device for purifying the exhaust gas of a diesel engine comprising:
   a filter for collecting particulates, which is arranged in the exhaust system of the engine;
   an oxidation catalyst arranged in said exhaust system upstream of said filter;
   diesel fuel supply means for supplying diesel fuel to said oxidation catalyst when said filter must be regenerated; and
   heating means for heating the diesel fuel supplied from said diesel fuel supply means to said oxidation catalyst only in the initial step of supplying the diesel fuel when a temperature of said oxidation catalyst is lower than a predetermined temperature and said filter must be regenerated.

2. A device according to claim 1, wherein said diesel fuel supply means has a fuel passage connected to the fuel tank of said engine.

3. A device according to claim 1, wherein said diesel engine has an exhaust gas recirculation system which connects the intake system of the engine with the exhaust system between said oxidation catalyst and said filter.

4. A device for purifying the exhaust gas of a diesel engine comprising:
   a filter for collecting particulates, which is arranged in the exhaust system of the engine;
   an oxidation catalyst arranged in said exhaust system upstream of said filter;
   diesel fuel supply means for supplying diesel fuel to said oxidation catalyst when said filter must be regenerated; and
   separation means for separating light molecular weight components from the diesel fuel supplied from said diesel fuel supply means to supply said light molecular weight components to said oxidation catalyst in the initial step of supplying the diesel fuel.

5. A device according to claim 4, wherein said diesel fuel supply means has a fuel passage connected to the fuel tank of said engine.

6. A device according to claim 4, wherein said separation means is a hydrocarbon absorbent arranged between said diesel fuel supply means and said oxidation catalyst.

7. A device for purifying the exhaust gas of a diesel engine comprising:
   a filter for collecting particulates, which is arranged in the exhaust system of the engine;
   an oxidation catalyst arranged in said exhaust system upstream of said filter;
   diesel fuel supply means for supplying diesel fuel to said oxidation catalyst when said filter must be regenerated; and
   changing means for changing the molecular weight of the diesel fuel, supplied from said diesel fuel supply means to said oxidation catalyst at least in the initial step of supplying the diesel fuel to a low molecular weight by use of the heat of the previous filter regeneration.

8. A device according to claim 7, wherein said diesel fuel supply means has a fuel passage connected to the fuel tank of said engine.

9. A device according to claim 7, wherein said changing means has a heat exchanger arranged around said exhaust system downstream of said filter through which said fuel passage of said diesel fuel supply means is connected to said fuel tank of said engine.

10. A device for purifying the exhaust gas of a diesel engine comprising:
    a filter for collecting particulates, which is arranged in the exhaust system of the engine;
    an oxidation catalyst arranged in said exhaust system upstream of said filter;
    diesel fuel supply means for supplying diesel fuel to said oxidation catalyst when said filter must be regenerated;
    intake air decreasing means for decreasing the amount of intake air in the initial step of supplying the diesel fuel; and diesel fuel decreasing means for decreasing the amount of diesel fuel supplied by said diesel fuel supply means when the amount of intake air is decreased by said intake air decreasing means.

11. A device according to claim 10, wherein said diesel fuel supply means has a fuel passage connected to the fuel tank of said engine.

12. A device according to claim 10, wherein said diesel engine has an exhaust gas recirculation system which connects the intake system of the engine with the exhaust system between said oxidation catalyst and said filter.

13. A device according to claim 10, wherein said diesel engine has an exhaust gas recirculation system, said device further comprises recirculation exhaust gas increasing means for increasing the amount of recirculation exhaust gas when the amount of intake air is decreased by said intake air decreasing means.

14. A device according to claim 13, wherein said exhaust gas recirculation system connects the intake system of the engine with the exhaust system between said oxidation catalyst and said filter.

* * * * *